May 24, 1949. H. G. HUGHEY 2,470,819
APPARATUS FOR FEEDING POWDERED MATERIAL
Filed Dec. 20, 1946 2 Sheets-Sheet 1
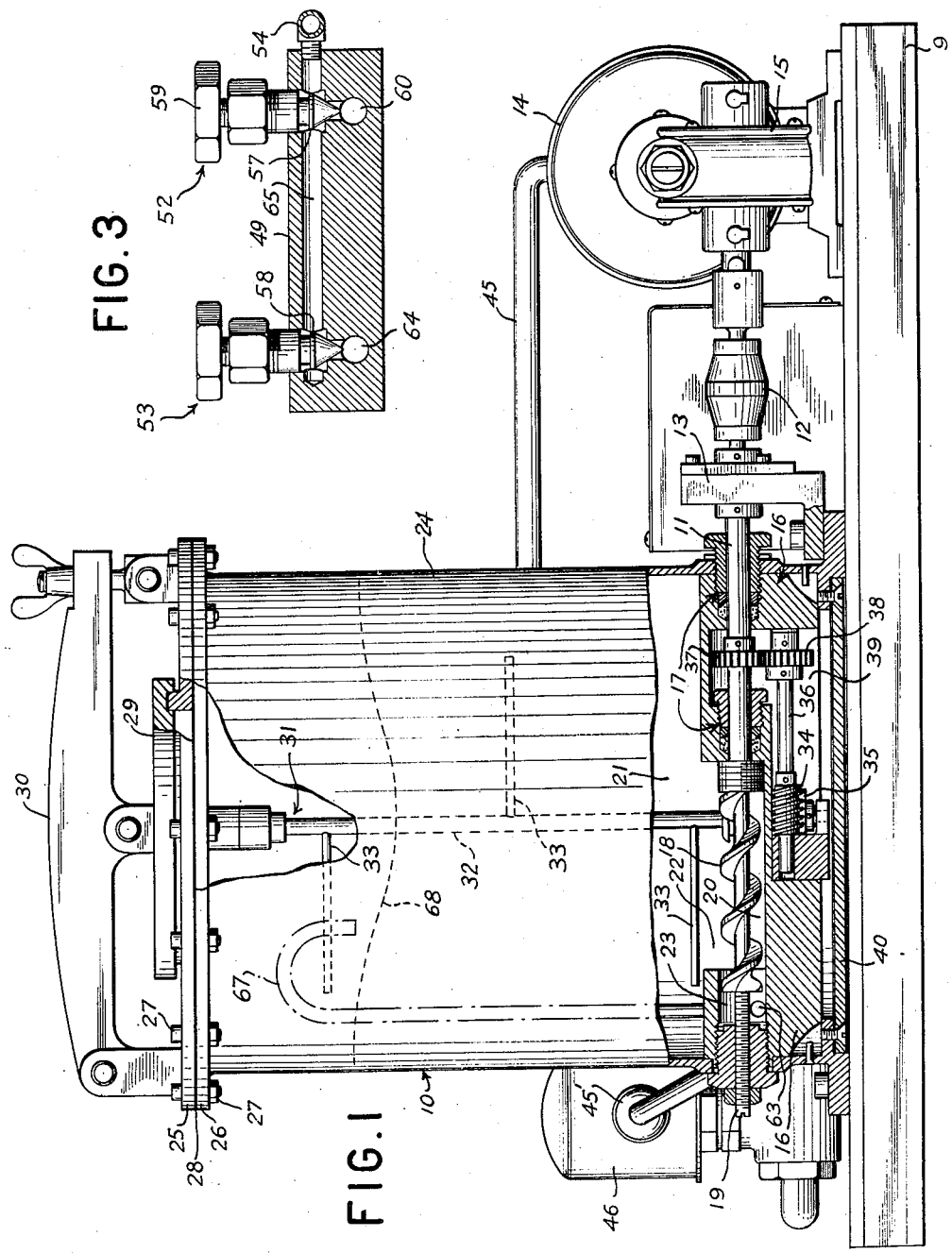
INVENTOR
HOWARD G. HUGHEY
BY
ATTORNEY

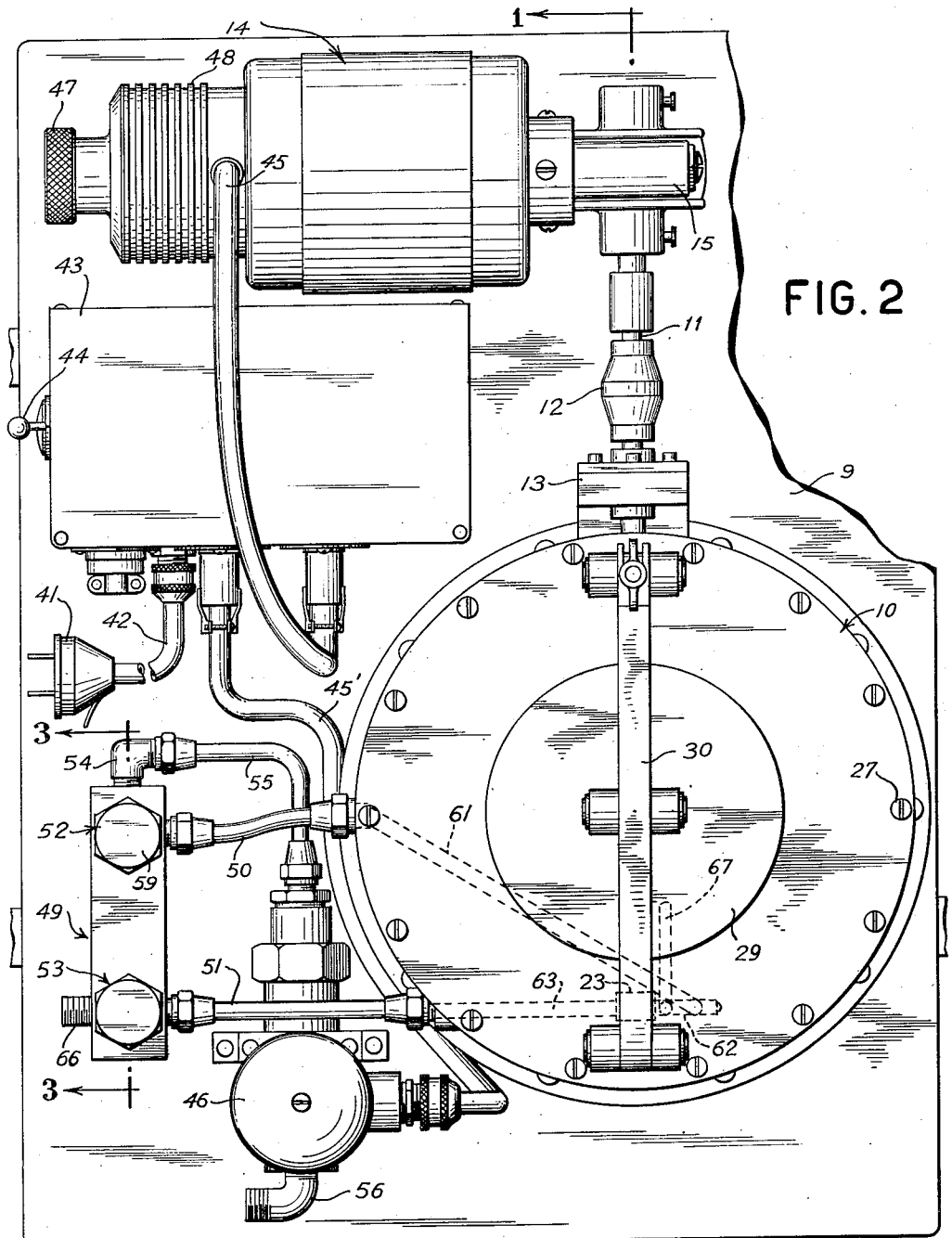

Patented May 24, 1949

2,470,819

UNITED STATES PATENT OFFICE 2,470,819

APPARATUS FOR FEEDING POWDERED MATERIAL

Howard G. Hughey, Fanwood, N. J., assignor to Air Reduction Company, Incorporated, a corporation of New York Application December 20, 1946, Serial No. 717,554

5 Claims. (Cl. 302—53)

This invention relates to apparatus for feeding powdered material into a gas stream for mixing with and entrainment by the gas.

In the oxygen cutting of stainless steel, and in certain other thermo-chemical operations on iron and steel, it is sometimes desirable to introduce into the oxygen stream finely divided sodium carbonate or other powdered material which acts as a flux that facilitates the cutting or other thermo-chemical operation.

If an aspirating effect of the flowing oxygen stream is largely depended upon to continuously introduce the flux powder into the oxygen stream, the rate at which the flux is introduced into the oxygen depends to a large extent on the rate of flow of the oxygen through the aspirator, and hence the more oxygen used in the cutting or other thermo-chemical operation the more flux there will be in the oxygen. But this is not always desirable. For instance, in the cutting of stainless steel the oxygen requirements increase more rapidly than the flux requirements as increasingly greater thicknesses of metal are cut, and therefore if the amount of flux present in the oxygen depends to a large extent on the amount of oxygen used, the flux is likely to be over-abundant as greater amounts of oxygen are used for cutting thicker work. It is therefore desirable that a flux feeder which works partly or wholly on the aspirator principle be provided with means by which the flux content in the oxygen can be readily adjusted, and the principal object of this invention is to provide such a flux feeder.

According to the invention a flux feeder, in which flux powder is introduced into an oxygen stream so that the amount of flux carried along by the oxygen stream is dependent to a substantial extent on the amount of oxygen flowing past the flux delivery point, is provided with a valve-controlled oxygen by-pass whereby all of the oxygen on its way to the cutting torch or other place of consumption can be made to pass by the flux delivery point and aspirate the flux powder, or any desired amount of it can be directed to the flux delivery point and the remainder by-passed around it. By properly adjusting the by-pass valve or valves the flux content in the oxygen at the place of consumption can be readily regulated, valve-adjustment that by-passes more oxygen serving to decrease the amount of flux in the oxygen at the place of consumption and valve-adjustment that by-passes less of the oxygen serving to increase the amount of flux in the oxygen at the place of consumption.

A flux feeeder embodying the invention is illustrated in the accompanying drawings, in which:

Figure 1 is a side elevation of the flux feeder in partial vertical section taken on the line 1—1 of Fig. 2;

Fig. 2 is a plan view of the flux feeder; and

Fig. 3 is a vertical section taken on the line 3—3 of Fig. 2 showing the interior of the by-pass valve block.

Referring to Fig. 1 the flux feeder shown therein comprises a base 9 on which a flux container 10 is supported. A shaft 11 having a universal joint 12 is supported in a bearing 13 and rotated by an electric motor 14 through speed reducing gearing 15. The shaft 11 extends through a portion of a block 16, forming the bottom member of the flux container 10, and through stuffing boxes 17. The end of the shaft is connected to one end of a spiral conveyor or feed screw 18. The other end of the feed screw abuts against a bearing pin 19 which receives the endwise thrust of the shaft and feed screw. The feed screw 18 rotates in a bore 20 in the block 16 having communication with the interior 21 of the flux container 10 through an opening 22 in the block. The extension of the bore 20 beyond the end of the feed screw 18 forms an aspiration chamber 23. A cylinder 24 rigidly secured at its lower end to the block 16 forms the side walls of the flux container. At its upper end the cylinder 24 is closed by a cover plate 25 secured to a flange 26 on the cylinder by bolts 27. A gasket 28 is inserted between the plate 25 and the flange on the cylinder. A removable closure plate 29 for an opening in the cover plate 25 is held tightly closed by a clamping lever 30. The flux container thus rendered gas-tight contains a supply of powdered flux that passes down through the opening 22 in the bottom block 16 into the bore 20 in the block.

An agitator 31 comprising a vertical shaft 32 and radially extending arms 33 is located in the cylinder 24 and rotates during operation of the flux feeder to prevent the flux from becoming too tightly packed or from arching over the opening 22. The agitator is rotated by a worm 34 which meshes with a worm wheel 35 secured to the shaft 32. The worm 34 is on a shaft 36 driven from the shaft 11 through gears 37 and 38. Rotation of the driving shaft 11 is thus transmitted to the shaft 36 through the meshing gears 37 and 38 and through the worm 34 and worm wheel 35 to the agitator 31. The agitator gear mechanism is housed in a chamber 39 in the block 16 which is closed by a removable bottom plate 40 on the under side of the block.

The electric motor 14 is connected in any suitable way to a power line as by means of a plug 41 (Fig. 2). A conductor 42 leads from the plug to a switch and terminal box 43 which houses a control switch to which the conductor 42 is connected. The control switch is operated by a handle 44 located exteriorly of the box 43. A conductor 45 connected to the control switch in the box 43 leads to the electric motor. Another conductor 45' leads from the box 43 to a solenoid valve 46 the function of which will hereinafter appear. Closing of the control switch by actuating the handle 44 energizes the solenoid valve 46 and the motor 14 simultaneously. A knob 47 on a centrifugal speed control governor 48 associated with the electric motor permits adjustment of the governor and regulation of the speed of the motor.

Located externally of the flux container (Fig. 2) is a valve block 49 which communicates with passages in the bottom block 16 of the flux container by means of tubes 50 and 51. Referring to Fig. 3, the valve block 49 preferably has two by-pass control valves 52 and 53 and a system of intercommunicating passages which are adapted to afford control of the amount of flux in the oxygen at the place of consumption, as will be more fully described. The valve block 49 has an inlet connection 54 to which cutting oxygen flows from the solenoid valve 46 (Fig. 2) through a tube 55. Oxygen supplied to the solenoid valve 46 through a fitting 56 and delivered to the valve block 49 is normally shut off by the valve elements 57 and 58 (Fig. 3) of the valves 52 and 53 respectively. The valve element 57 is retracted by turning the handle 59 to permit the oxygen to pass into a passage 60 and thence to the bottom block 16 of the flux container through the tube 50 (Fig. 2). When the valve element 58 is closed all of the oxygen supply released by the valve element 57 flows through the tube 50 and enters a passage 61 in the bottom block 16 of the flux container. From the passage 61 the oxygen flows to a connecting passage 62 in the block 16 which delivers it to the aspiration chamber 23. A passage 63, which is in effect a continuation of the passage 62, conducts the oxygen leaving the aspiration chamber to the tube 51 which conducts it back to passage 64 (Fig. 3) in the valve block 49. A by-pass passage 65 in the valve block 49 extends from the inlet connection 54 to the passage 64. Oxygen entering the passage 64 is discharged directly to the line connections through the fitting 66 (Fig. 2). The valve element 58 controls communication between the by-pass passage 65 and the passage 64.

No oxygen can flow to the line connections if both valves 52 and 53 are closed. Opening of the valve 52 alone permits all of the oxygen to pass through the aspiration chamber 23 to the discharge passage 64, and opening of the valve 53 alone permits all of the oxygen to flow through the by-pass passage 65 to the discharge passage 64. By properly adjusting the two valves 52 and 53 it is evident that any desired proportion of the incoming oxygen can be passed through the aspiration chamber 23 and any desired proportion can be diverted through the by-pass passage 65 to the discharge passage 64. As will now be described, this permits the quantity of flux content in the oxygen at the point of consumption to be regulated and precisely controlled.

The flux feeder is set in operation by snapping the switch handle 44 (Fig. 2) to its "on" position, i. e., the position in which the control switch in the box 43 is closed, thus simultaneously energizing the motor 14 and the solenoid valve 46. Oxygen flowing through the tube 55 from the solenoid valve 46 is divided according to the setting of the two valves 52 and 53, part of the total supply being diverted through the aspiration chamber 23 and the remainder through the by-pass passage 65 in the valve block 49.

Powdered flux fed into the bore 20 through the opening 22 in the bottom block 16 of the flux container (Fig. 1) is pushed forward in the bore by the feed screw 18 to the aspiration chamber 23 where it becomes aspirated by the oxygen passing through the chamber. The oxygen and entrained flux particles are conducted to the discharge passage 64 in the valve block 49 where the remainder of the oxygen diverted through the by-pass passage 65 and past the retracted valve element 58 combines with the flux-containing portion of the oxygen stream. The reunited oxygen stream and the entrained flux are discharged to the cutting torch or other piece of apparatus at the place of consumption through tubing or a hose attached to the valve block at the fitting 66.

A tube 67 communicates with the passage 62 in the bottom block 16 of the flux container just ahead of the aspiration chamber 23 (Fig. 2) and rises in the interior of the flux container to a point where it can discharge oxygen above the level of the reserve flux in the container indicated at 68. The tube 67 permits some of the oxygen to be conducted from the passage 62 in the bottom block 16 to the space above the level of the flux in the container and effects an equalization of the pressure in the space and the pressure in the passage 62. The oxygen delivered to the space above the level of the flux in the container filters through the agitated flux into the bore 20 and subsequently into the aspiration chamber 23. In filtering through the flux in this manner the oxygen gives a swirling motion to the flux in the bore 20 and keeps it in a fluffy or fluent condition which enables greater quantities of the flux to be delivered to and entrained by the oxygen stream passing through the aspiration chamber 23. The tube 67 therefore improves or enhances the aspirating effect that the oxygen has on the flux powder. The provision of the tube 67 also prevents the flux from being forced backward into the bore 20 and thus becoming clogged in the bore.

It will now be seen that the amount of flux added to the oxygen is largely dependent upon the aspirating effect of the oxygen passing through the aspiration chamber 23, and only to a minor extent on the speed of rotation of the feed screw 18. The valve-controlled oxygen by-pass therefore makes possible a wider range in the regulation of the flux content in the oxygen at the place of consumption than could be achieved by varying the speed of rotation of the feed screw 18. Although the speed of rotation of the feed screw 18 determines to some extent the rate at which the flux is fed into and picked up by the oxygen stream, the greater influence is the aspirating effect of the oxygen.

While the apparatus herein described was intended primarily for feeding powdered flux into the oxygen stream in thermo-chemical cutting or scarfing operations on iron or steel, it may be used if desired for feeding any powdered material into any gas stream.

I claim:

1. Apparatus for feeding powdered material into a gas stream comprising a hopper for the powdered material, means forming as aspiration chamber, means for feeding powdered material from the hopper to the ispiration chamber, a valve block, a gas inlet conduit leading to the aspiration chamber and including a passage extending through a portion of the valve block, a gas outlet conduit leading from the aspiration chamber and including a second passage extending through another portion of the valve block, the valve block having a by-pass connecting said first and second block passages, and a valve associated with the valve block having a valve element at the juncture of said first block passage and the by-pass adapted to regulate the amount of gas that flows through said first block passage to the aspiration chamber and the amount that flows through the by-pass to said second block passage.

2. Apparatus for feeding powdered material into a gas stream comprising a hopper for the powdered material, means forming an aspiration chamber, means for feeding powdered material from the hopper to the aspiration chamber, a valve block, a gas inlet conduit leading to the aspiration chamber and comprising a tube section leading to the valve block and a tube section leading from the valve block toward the aspiration chamber and a passage in the valve block adapted to place said tube sections in communication, a gas outlet conduit leading from the aspiration chamber and comprising a tube section connected to the valve block and a gas in-outlet connection on the valve block and a second passage in the valve block placing said last-named tube section in communication with said outlet connection, the valve block further having a by-pass connecting said first and second block passages, and a valve associated with said valve block having a valve element at the juncture of said first block passage and the by-pass adapted to regulate the amount of gas that flows through said first block passage to the aspiration chamber and the amount that flows through the by-pass to said second block passage.

3. Apparatus for feeding powdered material into a gas stream comprising a hopper for the powdered material, means forming an aspiration chamber, means for feeding powdered material from the hopper to the aspiration chamber, a valve block, a gas inlet conduit leading to the aspiration chamber and including a passage extending through a portion of the valve block, a gas outlet conduit leading from the aspiration chamber and including a second passage extending through another portion of the valve block, the valve block having a by-pass connecting said first and second block passages, a valve associated with said block having a valve element at the juncture of said first block passage and the by-pass, and a second valve associated with said block having a valve element controlling communication between the by-pass and the second block passage, said valve elements being adjustable to regulate the amount of gas that flows through said first block passage to the aspiration chamber and the amount that flows through the by-pass and into said second block passage.

4. Apparatus for feeding powdered material into a gas stream comprising a hopper for the powdered material, means forming an aspiration chamber, a gas inlet conduit leading to the aspiration chamber, a gas outlet conduit leading from the aspiration chamber, a feed screw arranged to receive powdered material from the hopper and to feed it into said aspiration chamber for entrainment by the gas passing from said inlet conduit to said outlet conduit through the aspiration chamber, a by-pass connecting said gas inlet conduit with said gas outlet conduit, and valve means controlling the by-pass and operable to cause any desired proportion of the gas to pass through the aspiration chamber and entrain powdered material and the remainder to be diverted through the by-pass and mix with the powder-containing portion of the gas leaving the aspiration chamber.

5. Apparatus for feeding powdered material into a gas stream comprising a hopper for the powdered material, means forming an aspiration chamber, a gas inlet conduit leading to the aspiration chamber, a gas outlet conduit leading from the aspiration chamber, a feed screw arranged to receive powdered material from the hopper and to feed it into said aspiration chamber for entrainment by the gas passing from said inlet conduit to said outlet conduit through the aspiration chamber, an electric motor operatively connected to said feed screw to rotate the same, a by-pass connecting said gas inlet conduit with said gas outlet conduit, valve means controlling the by-pass and operable to cause any desired proportion of the gas to pass through the aspiration chamber and entrain powdered material and the remainder to be diverted through the by-pass and mix with the powder-containing portion of the gas leaving the aspiration chamber, an electro-magnetically operated valve in said gas inlet conduit in advance of said by-pass, and switch means adapted to simultaneously energize said motor and the electro-magnetic operating means of said last-named valve to start said feed screw and at the same time turn on the gas supply to the aspiration chamber.

HOWARD G. HUGHEY.

REFERENCES CITED

The following references are of record in the file of this patent:

UNITED STATES PATENTS

| Number | Name | Date |
|---|---|---|
| 749,206 | Limbert | Jan. 12, 1904 |
| 2,123,537 | Marr | July 12, 1938 |
| 2,327,337 | Burch et al. | Aug. 24, 1943 |

Certificate of Correction

Patent No. 2,470,819.  May 24, 1949.

HOWARD G. HUGHEY

It is hereby certified that errors appear in the printed specification of the above numbered patent requiring correction as follows:

Column 5, line 1, claim 1, for the word "as" read *an*; line 3, same claim, for "ispiration" read *aspiration*; line 32, claim 2, after "gas" strike out *in-*;

and that the said Letters Patent should be read with these corrections therein that the same may conform to the record of the case in the Patent Office.

Signed and sealed this 25th day of October, A. D. 1949.

[SEAL]

THOMAS F. MURPHY,
*Assistant Commissioner of Patents.*